UNITED STATES PATENT OFFICE.

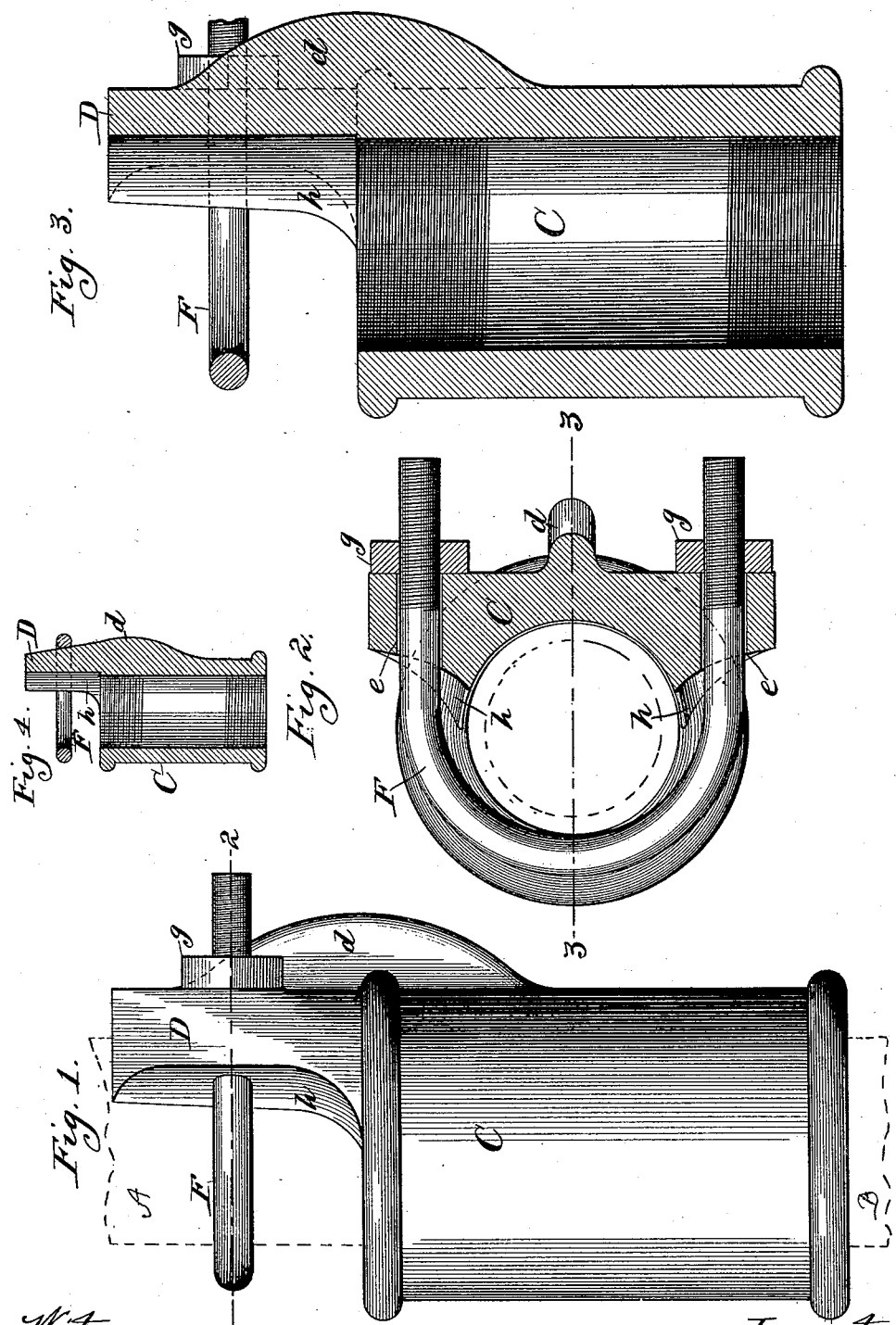

WALTER C. WESTAWAY, OF DECORAH, IOWA.

PIPE-COUPLING.

SPECIFICATION forming part of Letters Patent No. 454,690, dated June 23, 1891.

Application filed November 3, 1890. Serial No. 370,170. (No model.)

*To all whom it may concern:*

Be it known that I, WALTER C. WESTAWAY, a citizen of the United States of America, residing at Decorah, in the county of Winneshiek and State of Iowa, have invented a certain new and useful Improvement in Pipe-Couplings, of which the following is a specification.

Referring to the accompanying drawings, wherein like reference-letters indicate like parts, Figure 1 is a side elevation; Fig. 2, a cross-section; Fig. 3, a vertical section; and Fig. 4, a vertical section showing a slight modification.

In constructing windmill-towers, electric-light towers, and other similar structures of iron or steel pipes connected together the lateral strains upon the upright pipes, especially the corner-pipes, are unequal, and frequently so great as to fracture the pipes where they are weakened by the screw-threads at the end of the couplings.

The object of my invention is to provide a simple and effective means in the coupling itself for preventing this liability to accidental fracture.

In the drawings, A B indicate two pipe-sections coupled together by the usual screw-threaded tubular coupling C, into the opposite ends of which said pipe-sections are respectively screwed. On one, or, if desired each, end of the coupling-tube C, I cast an extension D, adapted to project beyond the end of the tube C and fit against one side of the pipe A or B. The extension D is cast sufficiently thick and stout to give it the necessary strength, and is preferably further strengthened by the addition of a rib $d$ on its outer side, extending well down upon the tube C, as shown. Through the opposite sides of the extension D holes $e$ $e$ are bored to receive a staple F, which is adjustably secured therein by means of screw-nuts $g$, applied upon its ends. I preferably bevel off the corners of the extension D at the points marked $h$ $h$, as shown.

The pipe-sections having been screwed into the coupling-tube C, the U-shaped staple is then placed around the pipe and its ends inserted through the holes $e$ $e$ and tightened up by the nuts $g$, clamping the pipe firmly against the extension D. The strength of the extension D and its staple F is thus brought to bear upon the pipe to support it at its weakest point, with the result of effectively obviating all danger of fracture at that point.

Fig. 4 represents an equivalent construction, in which the staple F is made in the form of a ring and passed around the extension D and the pipe and tightened by forcing it down on the inclined rib $d$.

Having thus described my invention, what I claim as new, and desire to secure by Letters Patent, is—

1. A pipe-coupling tube C, screw-threaded on the inside to secure the ends of the pipe-sections, provided with the terminal extension D, adapted to fit the side of the pipe, and combined with the staple F and screw-nut $g$, for the purpose of clamping the pipe to the extension D at a point outside of the screw-threaded portion of the coupling-tube, substantially as described.

2. The screw-threaded coupling-tube C, having the terminal extension D, strengthened by the rib $d$, extending from it to the body of the tube, as shown, and combined with the staple F and screw-nuts $g$ $g$, substantially as described.

WALTER C. WESTAWAY.

Witnesses:
C. W. BURDICK,
L. W. BEARD.